(12) United States Patent
Lin et al.

(10) Patent No.: US 10,955,597 B2
(45) Date of Patent: Mar. 23, 2021

(54) OPTICAL DEVICES

(71) Applicant: VisEra Technologies Company Limited, Hsin-Chu (TW)

(72) Inventors: Kuo-Feng Lin, Kaohsiung (TW); Chin-Chuan Hsieh, Hsin-Chu (TW)

(73) Assignee: VISERA TECHNOLOGIES COMPANY LIMITED, Hsin-Chu (TW)

(*) Notice: Subject to any disclaimer, the term of this patent is extended or adjusted under 35 U.S.C. 154(b) by 254 days.

(21) Appl. No.: 16/240,476

(22) Filed: Jan. 4, 2019

(65) Prior Publication Data
US 2020/0217997 A1 Jul. 9, 2020

(51) Int. Cl.
*G02B 5/20* (2006.01)
*G02B 1/11* (2015.01)

(52) U.S. Cl.
CPC . *G02B 5/20* (2013.01); *G02B 1/11* (2013.01)

(58) Field of Classification Search
CPC . G02B 5/20; G02B 1/11; G02B 5/005; G02B 5/201; G02B 5/003; G02B 5/208; G02B 5/22; G02B 5/223
USPC ............................................... 359/885
See application file for complete search history.

(56) References Cited

U.S. PATENT DOCUMENTS

| | | | |
|---|---|---|---|
| 6,040,591 A | 3/2000 | Otsuka | |
| 8,988,565 B2* | 3/2015 | Asano | G02B 5/201 |
| | | | 348/270 |
| 9,780,131 B1* | 10/2017 | Woo | H01L 27/14621 |

FOREIGN PATENT DOCUMENTS

| | | |
|---|---|---|
| JP | H04343470 A | 11/1992 |
| JP | 2004031532 A | 1/2004 |
| JP | 2006237122 A | 9/2006 |
| JP | 2007181209 A | 7/2007 |
| JP | 2016225584 A | 12/2016 |
| TW | 201642455 A | 12/2016 |
| TW | 201642457 A | 12/2016 |

OTHER PUBLICATIONS

Office Action dated Apr. 20, 2020 in TW Application No. 108123242.
Office Action dated Mar. 26, 2020 in JP Application No. 2019-102707.

* cited by examiner

*Primary Examiner* — William R Alexander
*Assistant Examiner* — Henry A Duong
(74) *Attorney, Agent, or Firm* — Muncy, Geissler, Olds & Lowe, P.C.

(57) ABSTRACT

An optical device is provided. The optical device includes a substrate, a plurality of color filters formed on the substrate, and a plurality of spacers formed between the color filters. Each spacer has a first sidewall and a second sidewall opposite to the first sidewall. There is a first angle between the first sidewall of each spacer and a normal line of the top surface of the substrate. There is a second angle between the second sidewall of each spacer and the normal line of the top surface of the substrate. At least one of the first angle and the second angle is increased gradually towards the edge of the substrate.

13 Claims, 6 Drawing Sheets

OPTICAL DEVICES

BACKGROUND OF THE INVENTION

Field of the Invention

The invention relates to an optical device, and more particularly to an optical device with tilted low-refractive-index grids.

Description of the Related Art

In an optical device with a composite metal grid (CMG)-type structure, a microlens is required above the color filters. In an optical device with a wave guide color filter (WGCF)-type structure, a low-refractive-index material layer surrounding the color filters is used instead of the microlens to form a wave guide structure.

However, in an optical device with a wave guide color filter (WGCF)-type structure, due to the absorption of oblique light by metal grids, the quantum effect (QE) of the current pixel is dropped, especially for pixels located in the peripheral region of the substrate.

Therefore, development of an optical device with a wave guide color filter (WGCF)-type structure capable of improving the quantum effect (QE) and keeping low cross-talk between color filters, without introduction of a shifting design on edge pixels, is desirable.

BRIEF SUMMARY OF THE INVENTION

In accordance with one embodiment of the invention, an optical device is provided. The optical device comprises a substrate, a plurality of color filters formed on the substrate, and a plurality of spacers formed between the color filters. Each spacer has a first sidewall and a second sidewall opposite to the first sidewall. There is a first angle between the first sidewall of each spacer and a normal line of the top surface of the substrate. There is a second angle between the second sidewall of each spacer and the normal line of the top surface of the substrate. At least one of the first angle and the second angle is increased gradually towards the edge of the substrate.

In some embodiments, the substrate comprises a central region, a middle region and an edge region, the middle region being located between the central region and the edge region.

In some embodiments, the first angle and the second angle are zero degrees within the central region. In some embodiments, the first angle is greater than zero degrees, and the second angle is zero degrees within the middle region. In some embodiments, the first angle is in a range that greater than or equal to about 8 degrees and less than or equal to about 16 degrees within the middle region. In some embodiments, the first angle within the edge region is greater than that within the middle region, and the second angle is zero degrees within the edge region. In some embodiments, the first angle is in a range that greater than about 16 degrees and less than or equal to about 30 degrees within the edge region.

In some embodiments, the first angle is equal to the second angle within the middle region. In some embodiments, the first angle and the second angle are greater than zero degrees within the middle region. In some embodiments, the first angle and the second angle are in a range that greater than or equal to about 8 degrees and less than or equal to about 16 degrees within the middle region. In some embodiments, the first angle within the edge region is greater than that within the middle region, and the second angle within the edge region is greater than that within the middle region. In some embodiments, the first angle and the second angle are in a range that greater than about 16 degrees and less than or equal to about 30 degrees within the edge region.

In some embodiments, the spacers have a refractive index which is in a range from about 1.2 to about 1.5. In some embodiments, the optical device further comprises a first high-refractive-index material layer formed on the color filters and the spacers. In some embodiments, the optical device further comprises a planarization layer formed on the first high-refractive-index material layer. In some embodiments, the optical device further comprises an anti-reflection layer formed on the planarization layer. In some embodiments, the optical device further comprises a second high-refractive-index material layer formed between the first high-refractive-index material layer and the planarization layer. In some embodiments, each color filter has a refractive index which is greater than that of the first high-refractive-index material layer, the refractive index of the first high-refractive-index material layer is greater than that of the second high-refractive-index material layer, the refractive index of the second high-refractive-index material layer is greater than that of the planarization layer, and the refractive index of the planarization layer is greater than that of the anti-reflection layer.

In the present invention, by adjusting the tilted angle of the single sidewall of the spacer (i.e. a low-refractive-index grid), the tilted angle of the spacer increases gradually from the central region to the edge region of the substrate. Therefore, the tilted angle of the spacer located at the edge region of the substrate is sufficient to provide an optimal wave guide effect, improving the quantum effect (QE) of the pixels located at the edge region of the substrate (i.e. improvement of the optical efficiency response for large-angle incident light).

Similarly, by adjusting the tilted angle of the dual sidewalls of the spacer, the tilted angle of the spacer increases gradually from the central region to the edge region of the substrate. Therefore, the tilted angle of the spacer located at the edge region of the substrate is sufficient to provide an optimal wave guide effect, improving the quantum effect (QE) of the pixels located at the edge region of the substrate.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
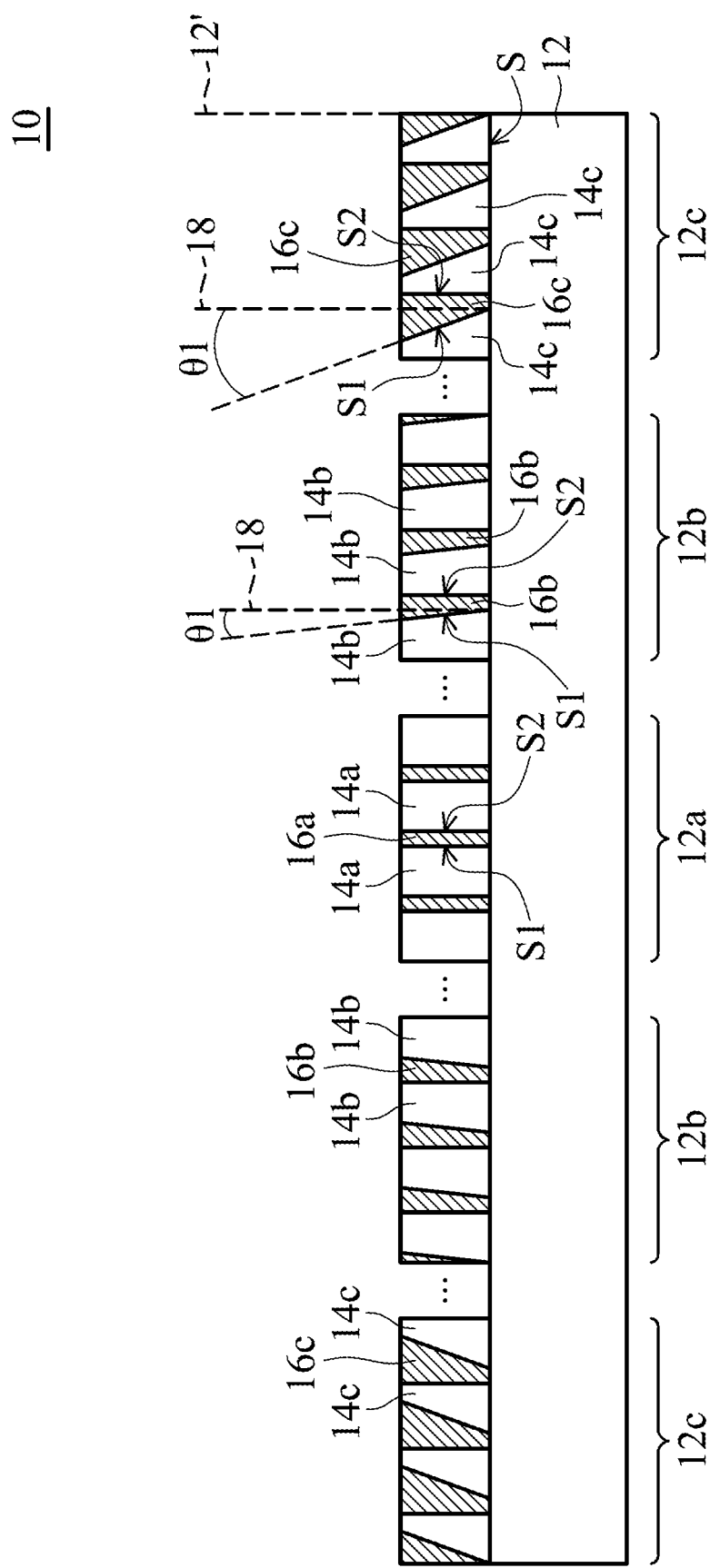
FIG. 1 is a cross-sectional view of an optical device in accordance with one embodiment of the invention.

Referring to FIG. 1, in accordance with one embodiment of the invention, an optical device 10 is provided. FIG. 1 shows a cross-sectional view of the optical device 10.

The optical device 10 comprises a substrate 12, a plurality of color filters (14a, 14b and 14c) and a plurality of spacers (16a, 16b and 16c). The substrate 12 has a central region 12a, a middle region 12b and an edge region 12c. The middle region 12b is located between the central region 12a and the edge region 12c. The color filters (14a, 14b and 14c) are formed on the substrate 12. The spacers (16a, 16b and 16c) (i.e. low-refractive-index grids, LNG) are formed between the color filters (14a, 14b and 14c). Each spacer (16a, 16b and 16c) has a first sidewall S1 and a second sidewall S2 which is opposite to the first sidewall S1. There is a first angle "θ1" between the first sidewall S1 of each spacer (16a, 16b and 16c) and a normal line 18 of the top surface S of the substrate 12. There is a second angle (not shown) between the second sidewall S2 of each spacer (16a, 16b and 16c) and the normal line 18 of the top surface S of the substrate 12. Specifically, the first angle "θ1" increases gradually towards the edge 12' of the substrate 12, and the second angle (not shown) is zero degrees within the central region 12a, the middle region 12b and the edge region 12c.

In some embodiments, the color filters (14a, 14b and 14c) comprise red color filters, green color filters and blue color filters.

In some embodiments, the refractive index of the spacers (16a, 16b and 16c) is in a range from about 1.2 to about 1.5.

In some embodiments, the first angle "θ1" is in a range from about zero degrees to about 30 degrees from the central region 12a to the edge region 12c of the substrate 12.

In some embodiments, the first angle "θ1" within the central region 12a of the substrate 12 is about zero degrees.

In some embodiments, the first angle "θ1" within the middle region 12b of the substrate 12 is greater than zero degrees, for example, greater than or equal to about 8 degrees and less than or equal to about 16 degrees.

In some embodiments, the first angle "θ1" within the edge region 12c of the substrate 12 is in a range that greater than about 16 degrees and less than or equal to about 30 degrees.

In FIG. 1, the tilted profiles of the spacers (16a, 16b and 16c) can also be regarded as the single-sidewall tilt of the low-refractive-index grid (LNG).

In some embodiments, the various angles of incident light respectively correspond to the central region 12a, the middle region 12b and the edge region 12c of the substrate 12. For example, the incident light with about a zero-degree angle corresponds to the central region 12a. The incident light with about a 15-degree angle corresponds to the middle region 12b. The incident light with about a 30-degree angle corresponds to the peripheral region 12c.

Figure 2:
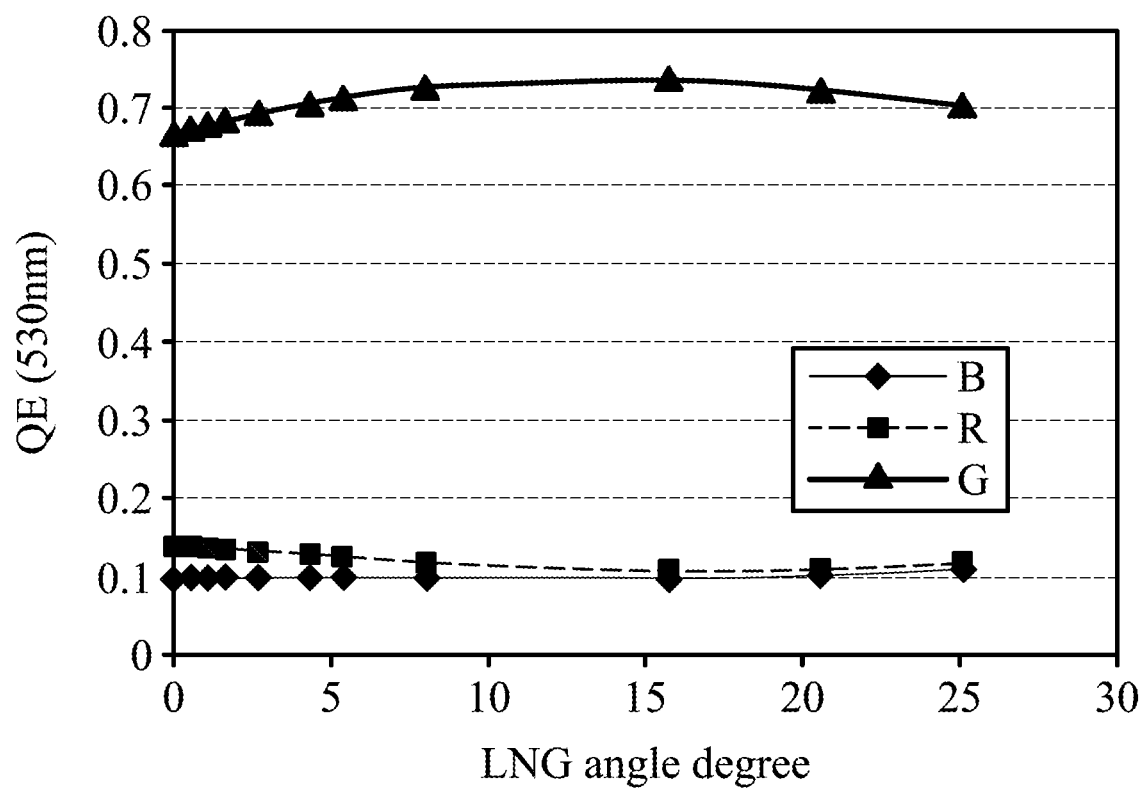
FIG. 2 shows a relationship between QE data and low-refractive-index spacers with various tilted profiles in an optical device in accordance with one embodiment of the invention.

FIG. 2 shows a relationship between the QE data and the spacers (i.e. low-refractive-index material layers; low-refractive-index grids (LNG)) with various tilted profiles (i.e. various LNG angle degrees) in an optical device, when the incident light is 30 degrees.

In FIG. 2, the curve "G" shows various QE data of the green (G) color filters surrounded by the spacers with various tilted profiles. The curve "R" shows various QE data of the red (R) color filters surrounded by the spacers with various tilted profiles. The curve "B" shows various QE data of the blue (B) color filters surrounded by the spacers with various tilted profiles.

In the curve "G", when the spacer surrounding the green color filter is not tilted, the QE data of the green color filter is merely about 0.66. In this situation, a large part of the oblique light is absorbed by metal grids and leaks to neighboring pixels. However, as the tilted angle of the spacer surrounding the green color filter increases, the QE data of the green color filter increases (i.e. more oblique light being localized in the current pixel and light-leakage to neighboring pixels being reduced). For example, when the spacer surrounding the green color filter is tilted by about 5 degrees, the QE data of the green color filter is improved to about 0.70. Similarly, when the spacer surrounding the green color filter is tilted by about 25 degrees, the QE data of the green color filter is also improved to about 0.70. In addition, it is worth noting that when the spacer surrounding the green color filter is tilted by about 16 degrees, the QE data of the green color filter is improved to about 0.75. Therefore, when the incident light is 30 degrees (i.e. corresponding to the pixels located at the edge region of the substrate), if the spacer surrounding the green color filter is tilted by about 16 degrees, the green color filter achieves the greatest QE performance.

Figure 3:
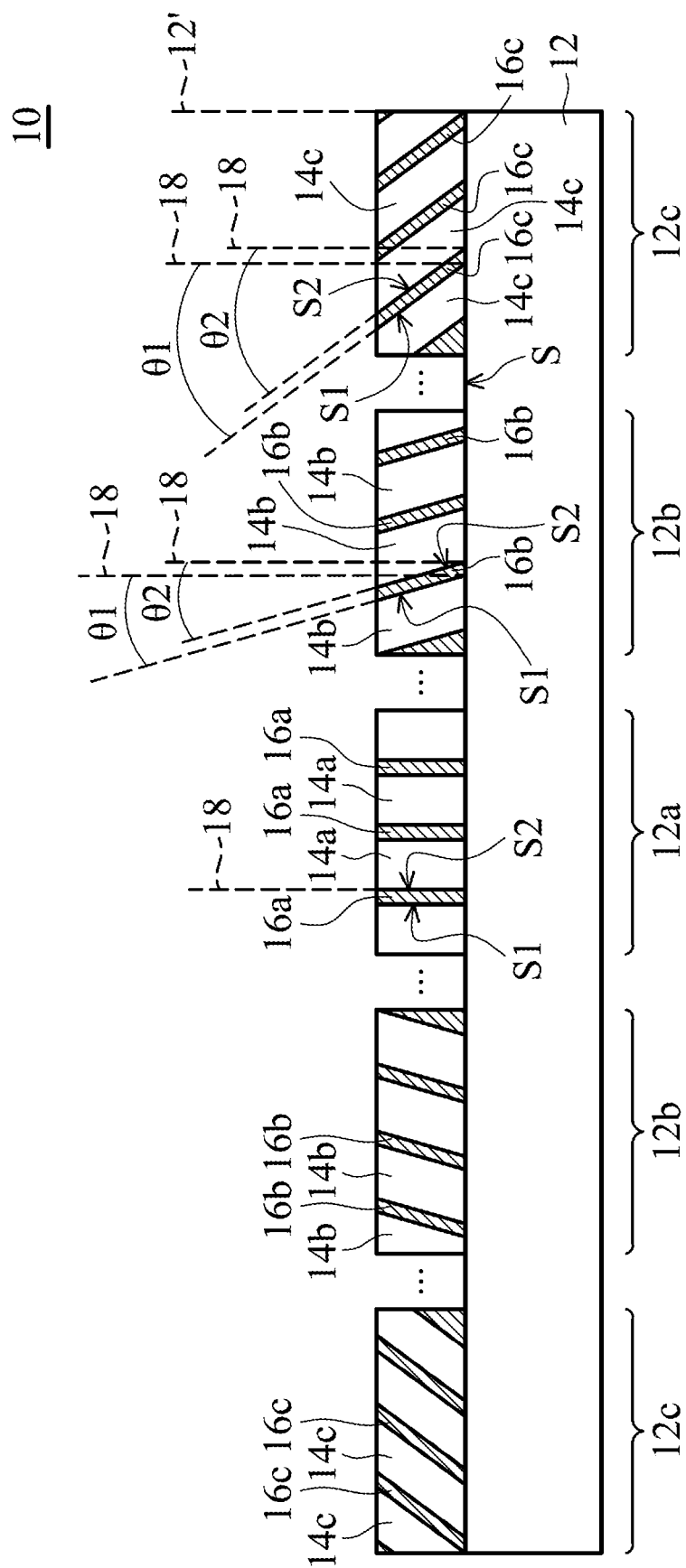
FIG. 3 is a cross-sectional view of an optical device in accordance with one embodiment of the invention.

Referring to FIG. 3, in accordance with one embodiment of the invention, an optical device 10 is provided. FIG. 3 shows a cross-sectional view of the optical device 10.

The optical device 10 comprises a substrate 12, a plurality of color filters (14a, 14b and 14c) and a plurality of spacers (16a, 16b and 16c). The substrate 12 has a central region 12a, a middle region 12b and an edge region 12c. The middle region 12b is located between the central region 12a and the edge region 12c. The color filters (14a, 14b and 14c) are formed on the substrate 12. The spacers (16a, 16b and 16c) (i.e. low-refractive-index grids, LNG) are formed between the color filters (14a, 14b and 14c). Each spacer (16a, 16b and 16c) has a first sidewall S1 and a second sidewall S2 which is opposite to the first sidewall S1. There is a first angle "θ1" between the first sidewall S1 of each spacer (16a, 16b and 16c) and a normal line 18 of the top surface S of the substrate 12. There is a second angle "θ2" between the second sidewall S2 of each spacer (16a, 16b and 16c) and the normal line 18 of the top surface S of the substrate 12. Specifically, the first angle "θ1" and the second angle "θ2" increase gradually towards the edge 12' of the substrate 12.

In some embodiments, the color filters (14a, 14b and 14c) comprise red color filters, green color filters and blue color filters.

In some embodiments, the refractive index of the spacers (16a, 16b and 16c) is in a range from about 1.2 to about 1.5.

In some embodiments, the first angle "θ1" and the second angle "θ2" are in a range from about zero degrees to about 30 degrees from the central region 12a to the edge region 12c of the substrate 12.

In some embodiments, the first angle "θ1" and the second angle "θ2" within the central region 12a of the substrate 12 are about zero degrees.

In some embodiments, the first angle "θ1" is equal to the second angle "θ2" within the middle region 12b of the substrate 12.

In some embodiments, the first angle "θ1" and the second angle "θ2" within the middle region 12b of the substrate 12 are greater than zero degrees, for example, greater than or equal to about 8 degrees and less than or equal to about 16 degrees.

In some embodiments, the first angle "θ1" is equal to the second angle "θ2" within the edge region 12c of the substrate 12.

In some embodiments, the first angle "θ1" and the second angle "θ2" within the edge region 12c of the substrate 12 are in a range that greater than about 16 degrees and less than or equal to about 30 degrees.

In FIG. 3, the tilted profiles of the spacers (16a, 16b and 16c) can also be regarded as the dual-sidewall tilt of the low-refractive-index grid (LNG).

In some embodiments, the various angles of incident light respectively correspond to the central region 12a, the middle region 12b and the edge region 12c of the substrate 12. For example, the incident light with about a zero-degree angle corresponds to the central region 12a. The incident light with about a 15-degree angle corresponds to the middle region 12b. The incident light with about a 30-degree angle corresponds to the peripheral region 12c.

Figure 4:
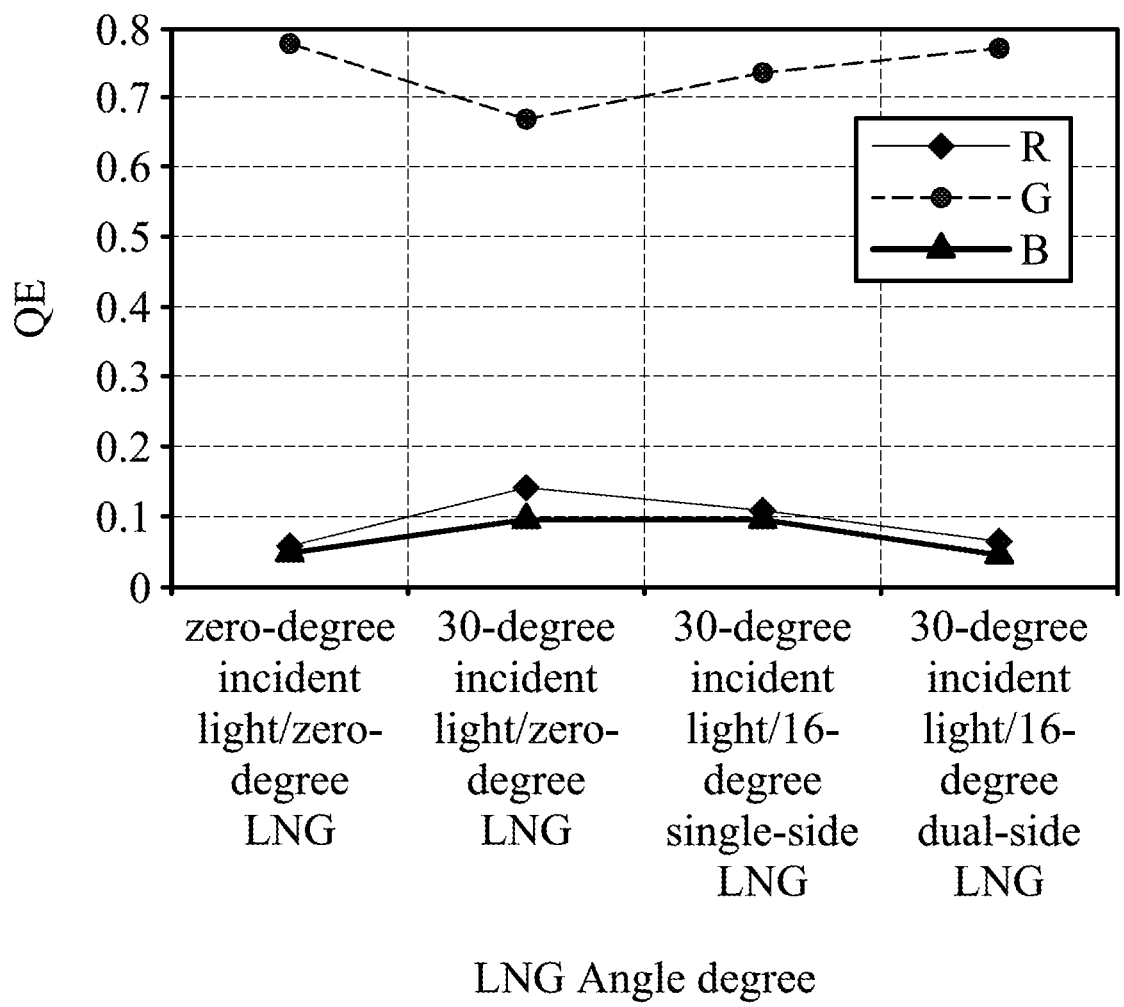
FIG. 4 shows a relationship between QE data and low-refractive-index spacers with various tilted profiles in an optical device in accordance with one embodiment of the invention.

FIG. 4 shows a relationship between the QE data and the spacers with various tilted profiles (i.e. various LNG angle degrees) in an optical device, when the incident light is zero degrees and 30 degrees, respectively.

In FIG. 4, the curve "G" shows various QE data of the green (G) color filters surrounded by the spacers with various tilted profiles. The curve "R" shows various QE data of the red (R) color filters surrounded by the spacers with various tilted profiles. The curve "B" shows various QE data of the blue (B) color filters surrounded by the spacers with various tilted profiles.

In the curve "G", when the incident light is zero degrees, the QE data of the green color filter is about 0.78. When the incident light is 30 degrees and the spacer surrounding the green color filter is not tilted, the QE data of the green color filter is reduced to about 0.66. In this situation, a large part of the oblique light is absorbed by metal grids and leaks to neighboring pixels. When the incident light is 30 degrees and the single sidewall of the spacer surrounding the green color filter is tilted by about 16 degrees (i.e. single-sidewall tilt of the low-refractive-index grid), the QE data of the green color filter is improved to about 0.72. As the number of the tilted sidewall of the spacer surrounding the green color filter increases, the QE data of the green color filter increases (i.e. more oblique light being localized in the current pixel and light-leakage to neighboring pixels being reduced). For example, when the incident light is 30 degrees and dual sidewalls of the spacer surrounding the green color filter are simultaneously tilted by about 16 degrees (i.e. dual-sidewall tilt of the low-refractive-index grid), the QE data of the green color filter is improved to about 0.78 which is similar to the situation that the incident light is zero degrees. Therefore, when the incident light is 30 degrees (i.e. corresponding to the pixels located at the edge region 12c of the substrate 12), if both sidewalls of the spacer surrounding the green color filter are simultaneously tilted by about 16 degrees, the green color filter achieves the greatest QE performance.

Figure 5:
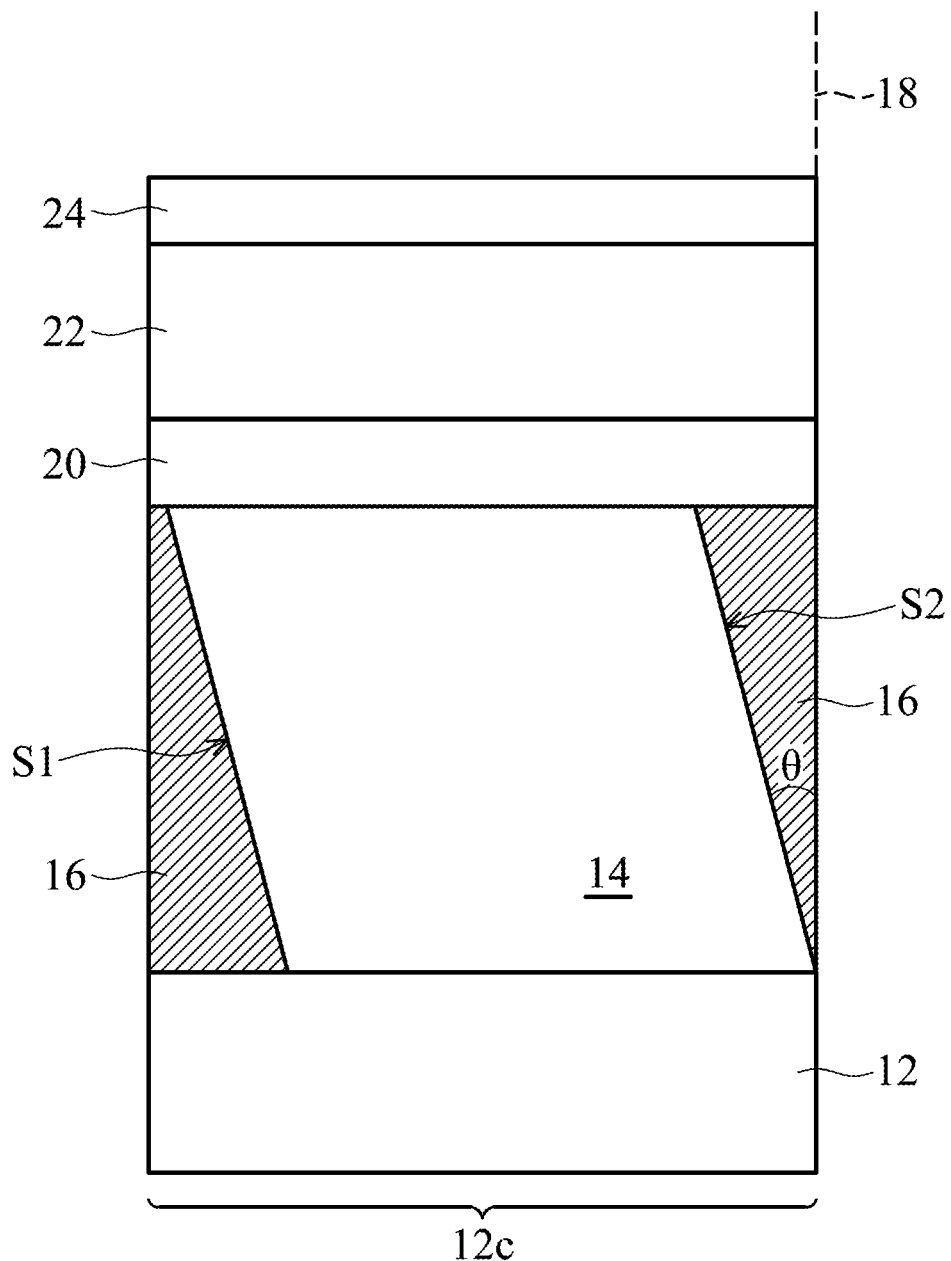
FIG. 5 is a cross-sectional view of a structure unit of an optical device in accordance with one embodiment of the invention.

Referring to FIG. 5, in accordance with one embodiment of the invention, a structure unit 10' of the optical device 10 shown in FIG. 3 is provided. FIG. 5 shows a cross-sectional view of the structure unit 10'.

The structure unit 10' taken as an example is located at the edge region 12c of the substrate 12. The structure unit 10' comprises the substrate 12, the color filter 14, the spacers 16, a high-refractive-index material layer 20, a planarization layer 22 and an anti-reflection layer 24. The color filter 14 is formed on the substrate 12. The spacer 16 has the first sidewall S1 and the second sidewall S2 which is opposite to the first sidewall S1. There is an angle "θ" between the first sidewall S1 or the second sidewall S2 of the spacer 16 and the normal line 18 of the substrate 12. The spacers 16 are formed adjacent to the color filter 14. The high-refractive-index material layer 20 is formed on the color filter 14 and the spacers 16. The planarization layer 22 is formed on the high-refractive-index material layer 20. The anti-reflection layer 24 is formed on the planarization layer 22.

In some embodiments, the color filter 14 comprises red color filter, green color filter or blue color filter.

In some embodiments, the refractive index of the spacers 16 is in a range from about 1.2 to about 1.5.

In some embodiments, the angle "θ" between the first sidewall S1 or the second sidewall S2 of the spacer 16 and the normal line 18 of the substrate 12 within the edge region 12c of the substrate 12 is in a range that greater than about 16 degrees and less than or equal to about 30 degrees.

In some embodiments, the refractive index of the color filter 14 is greater than the refractive index of the high-refractive-index material layer 20. The refractive index of the high-refractive-index material layer 20 is greater than the refractive index of the planarization layer 22. The refractive index of the planarization layer 22 is greater than the refractive index of the anti-reflection layer 24.

In some embodiments, the refractive index of the high-refractive-index material layer 20 located above the red (R) color filter 14 is greater than the refractive index of the high-refractive-index material layer 20 located above the green (G) color filter 14. The refractive index of the high-refractive-index material layer 20 located above the green (G) color filter 14 is greater than the refractive index of the high-refractive-index material layer 20 located above the blue (B) color filter 14. Under these conditions, the spacers 16 surrounding the red (R) color filter 14, the green (G) color filter 14 and the blue (B) color filter 14 have the same tilted angle "θ". The tilted angle "θ" of the spacers 16 surrounding the red (R) color filter 14, the green (G) color filter 14 and the blue (B) color filter 14 can be reduced by disposing the high-refractive-index material layer 20 above the color filter 14.

In some embodiments, the incident light with about a 30-degree angle corresponds to the edge region 12c.

Figure 6:
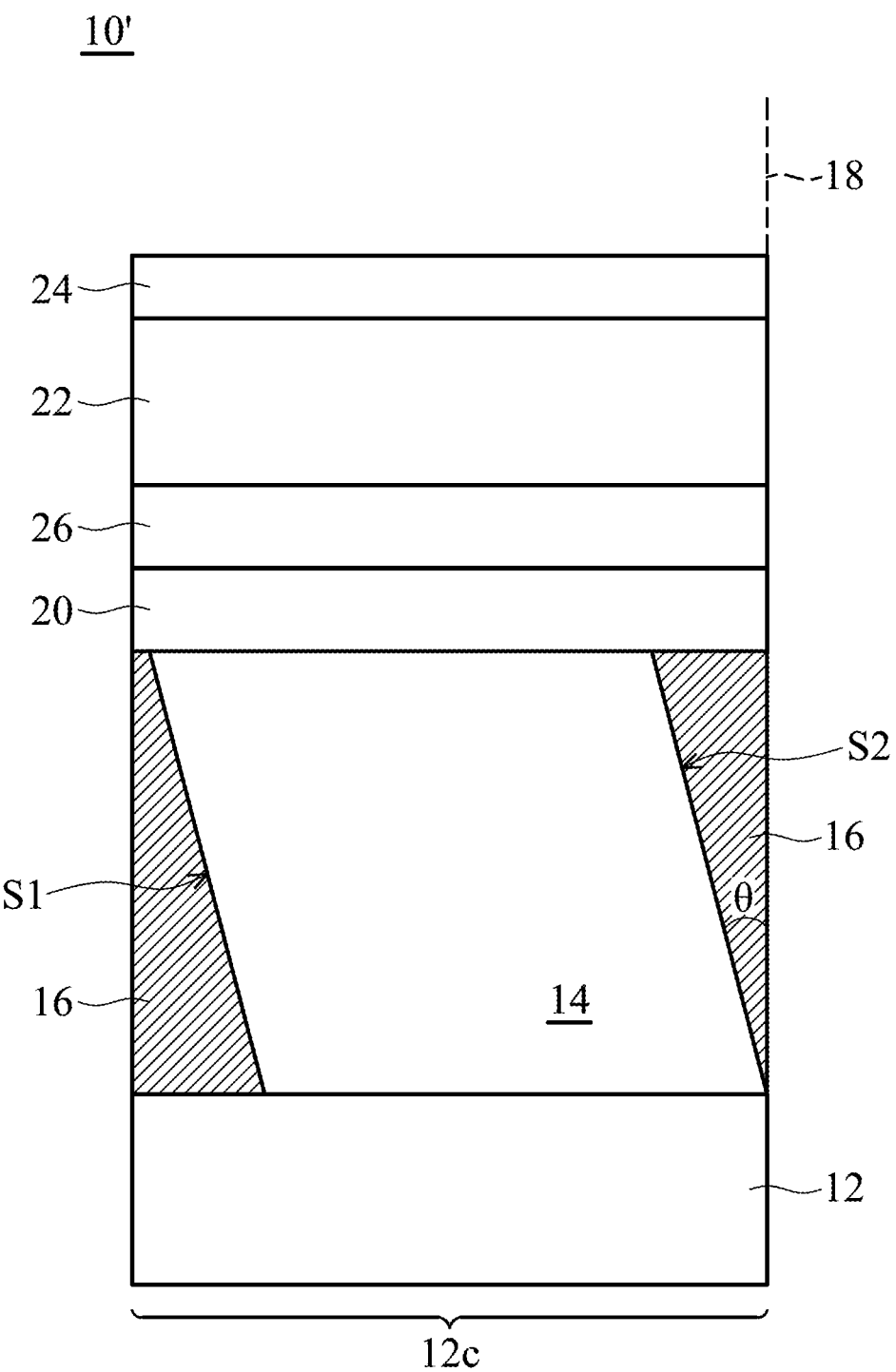
FIG. 6 is a cross-sectional view of a structure unit of an optical device in accordance with one embodiment of the invention.

Referring to FIG. 6, in accordance with one embodiment of the invention, a structure unit 10' of the optical device 10 shown in FIG. 3 is provided. FIG. 6 shows a cross-sectional view of the structure unit 10'.

The structure unit 10' taken as an example is located at the edge region 12c of the substrate 12. The structure unit 10' comprises the substrate 12, the color filter 14, the spacers 16, a first high-refractive-index material layer 20, a second high-refractive-index material layer 26, a planarization layer 22 and an anti-reflection layer 24. The color filter 14 is formed on the substrate 12. The spacer 16 has the first sidewall S1 and the second sidewall S2 which is opposite to the first sidewall S1. There is an angle "θ" between the first sidewall S1 or the second sidewall S2 of the spacer 16 and the normal line 18 of the substrate 12. The spacers 16 are formed adjacent to the color filter 14. The first high-refractive-index material layer 20 is formed on the color filter 14 and the spacers 16. The second high-refractive-index material layer 26 is formed on the first high-refractive-index material layer 20. The planarization layer 22 is formed on the second high-refractive-index material layer 26. The anti-reflection layer 24 is formed on the planarization layer 22.

In some embodiments, the color filter 14 comprises red color filter, green color filter or blue color filter.

In some embodiments, the refractive index of the spacers 16 is in a range from about 1.2 to about 1.5.

In some embodiments, the angle "θ" between the first sidewall S1 or the second sidewall S2 of the spacer 16 and the normal line 18 of the substrate 12 within the edge region 12c of the substrate 12 is in a range that greater than about 16 degrees and less than or equal to about 30 degrees.

In some embodiments, the refractive index of the color filter 14 is greater than the refractive index of the first high-refractive-index material layer 20. The refractive index of the first high-refractive-index material layer 20 is greater than the refractive index of the second high-refractive-index material layer 26. The refractive index of the second high-refractive-index material layer 26 is greater than the refractive index of the planarization layer 22. The refractive index of the planarization layer 22 is greater than the refractive index of the anti-reflection layer 24.

In some embodiments, the refractive index of the first high-refractive-index material layer 20 located above the red (R) color filter 14 is greater than the refractive index of the first high-refractive-index material layer 20 located above the green (G) color filter 14. The refractive index of the first high-refractive-index material layer 20 located above the green (G) color filter 14 is greater than the refractive index of the first high-refractive-index material layer 20 located above the blue (B) color filter 14. Under these conditions, the spacers 16 surrounding the red (R) color filter 14, the green (G) color filter 14 and the blue (B) color filter 14 have the same tilted angle "θ". The tilted angle "θ" of the spacers 16 surrounding the red (R) color filter 14, the green (G) color filter 14 and the blue (B) color filter 14 can be reduced by disposing the first high-refractive-index material layer 20 and the second high-refractive-index material layer 26 above the color filter 14.

In some embodiments, the incident light with about a 30-degree angle corresponds to the edge region 12c.

In the present invention, by adjusting the tilted angle of the single sidewall of the spacer (i.e. a low-refractive-index grid), the tilted angle of the spacer increases gradually from the central region to the edge region of the substrate. Therefore, the tilted angle of the spacer located at the edge region of the substrate is sufficient to provide an optimal wave guide effect, improving the quantum effect (QE) of the pixels located at the edge region of the substrate (i.e. improvement of the optical efficiency response for large-angle incident light).

Similarly, by adjusting the tilted angle of the dual sidewalls of the spacer, the tilted angle of the spacers increases gradually from the central region to the edge region of the substrate. Therefore, the tilted angle of the spacer located at the edge region of the substrate is sufficient to provide an optimal wave guide effect, improving the quantum effect (QE) of the pixels located at the edge region of the substrate.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical device, comprising:
a substrate having a top surface and an edge;
a plurality of color filters formed on the substrate; and
a plurality of spacers formed between the color filters, each spacer having a first sidewall and a second sidewall opposite to the first sidewall,
wherein there is a first angle between the first sidewall of each spacer and a normal line of the top surface of the substrate, and there is a second angle between the second sidewall of each spacer and the normal line of the top surface of the substrate,
wherein at least one of the first angle and the second angle is increased gradually towards the edge of the substrate,
wherein the substrate comprises a central region, a middle region and an edge region, the middle region being located between the central region and the edge region,
wherein the first angle and the second angle are zero degrees within the central region, wherein the first angle is greater than zero degrees, and the second angle is zero degrees within the middle region, and
wherein the first angle is in a range that greater than or equal to about 8 degrees and less than or equal to about 16 degrees within the middle region.

2. The optical device as claimed in claim 1, wherein the first angle within the edge region is greater than that within the middle region, and the second angle is zero degrees within the edge region.

3. The optical device as claimed in claim 2, wherein the first angle is in a range that greater than about 16 degrees and less than or equal to about 30 degrees within the edge region.

4. An optical device, comprising:
a substrate having a top surface and an edge;
a plurality of color filters formed on the substrate; and
a plurality of spacers formed between the color filters, each spacer having a first sidewall and a second sidewall opposite to the first sidewall,
wherein there is a first angle between the first sidewall of each spacer and a normal line of the top surface of the substrate, and there is a second angle between the second sidewall of each spacer and the normal line of the top surface of the substrate,
wherein at least one of the first angle and the second angle is increased gradually towards the edge of the substrate,
wherein the substrate comprises a central region, a middle region and an edge region, the middle region being located between the central region and the edge region,
wherein the first angle and the second angle are zero degrees within the central region, and
wherein the first angle is equal to the second angle within the middle region.

5. The optical device as claimed in claim 4, wherein the first angle and the second angle are greater than zero degrees within the middle region.

6. The optical device as claimed in claim 5, wherein the first angle and the second angle are in a range that greater than or equal to about 8 degrees and less than or equal to about 16 degrees within the middle region.

7. The optical device as claimed in claim 6, wherein the first angle within the edge region is greater than that within the middle region, and the second angle within the edge region is greater than that within the middle region.

8. The optical device as claimed in claim 7, wherein the first angle and the second angle are in a range that greater than about 16 degrees and less than or equal to about 30 degrees within the edge region.

9. An optical device, comprising:
   a substrate having a top surface and an edge;
   a plurality of color filters formed on the substrate;
   a plurality of spacers formed between the color filters, each spacer having a first sidewall and a second sidewall opposite to the first sidewall; and
   a first high-refractive-index material layer having a refractive index formed on the color filters and the spacers,
   wherein there is a first angle between the first sidewall of each spacer and a normal line of the top surface of the substrate, and there is a second angle between the second sidewall of each spacer and the normal line of the top surface of the substrate,
   wherein at least one of the first angle and the second angle is increased gradually towards the edge of the substrate.

10. The optical device as claimed in claim 9, further comprising a planarization layer having a refractive index formed on the first high-refractive-index material layer.

11. The optical device as claimed in claim 10, further comprising an anti-reflection layer having a refractive index formed on the planarization layer.

12. The optical device as claimed in claim 11, further comprising a second high-refractive-index material layer having a refractive index formed between the first high-refractive-index material layer and the planarization layer.

13. The optical device as claimed in claim 12, wherein each color filter has a refractive index which is greater than that of the first high-refractive-index material layer, the refractive index of the first high-refractive-index material layer is greater than that of the second high-refractive-index material layer, the refractive index of the second high-refractive-index material layer is greater than that of the planarization layer, and the refractive index of the planarization layer is greater than that of the anti-reflection layer.

* * * * *